United States Patent [19]

Bawa et al.

[11] Patent Number: 4,732,715

[45] Date of Patent: Mar. 22, 1988

[54] MANUFACTURE OF POLYMERIC CONTACT LENSES

[75] Inventors: Rajan Bawa, Fairport; William G. Deichert, Macedon, both of N.Y.

[73] Assignee: Bausch & Lomb Incorporated, Rochester, N.Y.

[21] Appl. No.: 778,351

[22] Filed: Sep. 20, 1985

[51] Int. Cl.⁴ .............................................. B29D 11/00
[52] U.S. Cl. ..................................... 264/1.4; 264/2.1; 264/22; 264/311; 425/808
[58] Field of Search ................... 264/2.1, 1.4, 22, 311; 425/808, 174.4

[56] References Cited

U.S. PATENT DOCUMENTS

| | | |
|---|---|---|
| 2,525,664 | 10/1950 | Gadsby et al. ...................... 425/808 |
| 3,408,429 | 10/1968 | Wichterle . |
| 3,496,254 | 2/1970 | Wichterle . |
| 4,022,855 | 5/1977 | Hamblen .............................. 264/1.4 |
| 4,113,224 | 9/1978 | Clark et al. .......................... 264/1.4 |

FOREIGN PATENT DOCUMENTS 71830 4/1984 Japan .................... 264/1.4

Primary Examiner—James Lowe
Attorney, Agent, or Firm—Christopher E. Blank; Craig E. Larson; Bernard D. Bogdon

[57] ABSTRACT

While polymerizing a contact lens monomer in a mold, grooves or other surface configurations are formed on the resulting polymeric lens surface by irradiating the monomer through a mask pattern which corresponds to the grooves or other desired configurations.

7 Claims, 6 Drawing Figures

MANUFACTURE OF POLYMERIC CONTACT LENSES

SUMMARY OF THE INVENTION

This invention relates to the manufacture of contact lenses and more particularly to a method of controlling polymerization during the casting of a polymeric contact lens to obtain a desired surface configuration in the lens.

BACKGROUND OF THE INVENTION

The optical zones of most contact lenses of either the hard or soft types have smooth regular surfaces on both sides of the lens. Whether spherical, which is the most common surface curvature, or aspheric, the lens surfaces can usually be formed by molding in stationary or spinning molds. When irregularities in one of the surfaces are desired, however, the lens surface must be ground or lathed and then polished to provide the desired surface configuration. Since this must be done manually or by expensive automatic apparatus, cutting and polishing operations of this kind add to the manufacturing costs of lenses having irregularities in their surfaces.

A need has long existed for a less expensive method of making lenses which have surface irregularities, such as grooves and bifocal corrections. The present invention provides a method by which irregular lens surfaces can be formed inexpensively by molding without having to cut the lens surfaces.

The method of the invention comprises a method of making a contact lens of a desired surface configuration which comprises placing a quantity of polymerizable monomer on a mold surface, irradiating monomer on the mold surface with actinic radiation of wavelength and intensity effective to cause said monomer to polymerize, the irradiation of said monomer being through a mask pattern having shadow areas and clear areas, the conditions of irradiation being such that in the regions of the monomer which correspond to the shadow areas of the mask the monomer is polymerized, but at a rate slower than in the regions corresponding to the clear areas of the mask.

BRIEF DESCRIPTION OF THE FIGURES

The invention will be described further by reference to the drawings of which

DETAILED DESCRIPTION OF THE INVENTION

Figure 1:
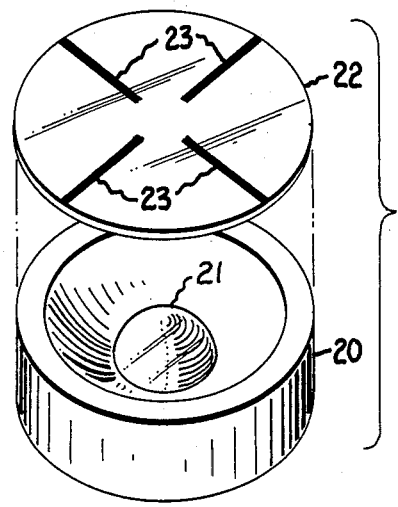
FIG. 1 is a view in perspective of a mold and mask for use in the method of the invention.

FIG. 1 shows in perspective a plastic mold 20 which can be used in the method of the invention for making composite contact lenses. The mold has a concave surface onto which is injected a monomeric composition 21. Also shown is mask 22 which is a clear transparent sheet on which is printed a desired pattern, in this case four radial lines 23.

Figure 2:
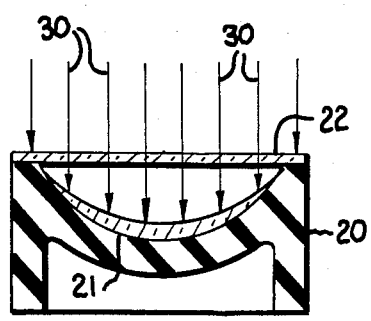
FIG. 2 is a side sectional view of a mold and mask with a layer of polymerizable monomer being irradiated.

FIG. 2 of the drawing shows the mold in cross-section during the making of a lens. A quantity of a first polymerizable monomer composition 21 is placed on the concave surface of plastic mold 20. The mold is rotated at a selected velocity about a vertical axis passing through the center of the concave surface. The monomer composition spreads centrifugally to form a lens-shaped layer on the concave surface of the mold. Monomer 21 is then subjected to actinic radiation such as ultraviolet radiation 30 from a source such as a sun lamp, not shown in the drawing. The radiation passes through the transparent parts of mask 22 and a shadow is cast on the monomer surface by the printed pattern of the mask.

For optimum results, all irradiated regions of the monomer are uniformly irradiated. This contributes to uniformity of the polymer and reduces stresses within the lens. Uniformity of irradiation can be achieved by collimating the radiation.

The present invention results from the discovery that when a liquid monomer in a spinning lens mold is irradiated through a transparent mask having an opaque pattern on it and affixed to it or otherwise spinning with the mold, the monomer polymerizes rapidly in the areas under the transparent parts of the mask and more slowly in the areas under the opaque pattern. Thus, with the mask shown in FIG. 1, the monomer will polymerize rapidly and form a hard polymer in all regions except in the four radial lines corresponding to the mask pattern.

Figure 3:
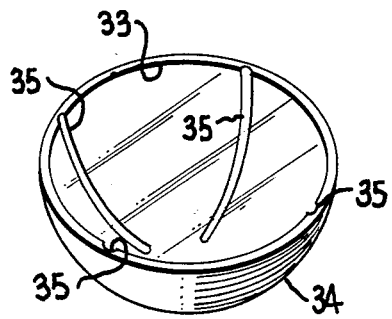
FIG. 3 is a perspective view of a lens with grooves in its posterior surface made by the method of the invention.

As shown in FIG. 3, the polymer surface 33 has grooves or troughs 35 which correspond to the radial lines 23 of the mask 22 of FIG. 1. The apparent explanation for the formation of the grooves is that the monomer in the region corresponding to the opaque lines on the mask 22 polymerizes more slowly than the rapidly polymerizing monomer in the intensely irradiated regions under the clear areas of the mask. As monomer is rapidly consumed in the clear areas, unreacted monomer from the masked regions migrates to the regions of more rapid polymerization. A depletion of monomer in the masked regions reduces the contour of the material in those regions and raises the contour in the irradiated areas. The resulting difference in the quantity of matter in the regions causes a difference in the surface configurations, as exemplified by the grooves in FIG. 3.

Although not so rapidly as the irradiated monomer in regions under the clear areas of the mask, the monomers in the regions under the opaque pattern also polymerize and harden. A combination of factors contributes to this. One is that, although masked from the direct UV irradiation, the masked region does receive some stray radiation. This can occur from edge effects on the mask pattern, from reflection from the mold surface or internal reflection from within the body of monomer.

Another factor is that the monomer composition preferably contains a free radical thermal catalyst and if the temperature is raised moderately, polymerization will occur even in non-irradiated regions.

Figure 5:
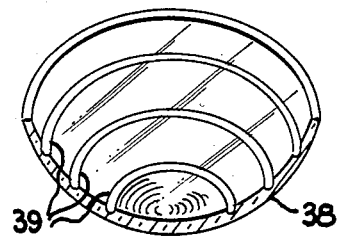
FIGS. 4-6 are perspective views of lenses with other configurations on their posterior surfaces as made by the method of the invention.
Figure 4:
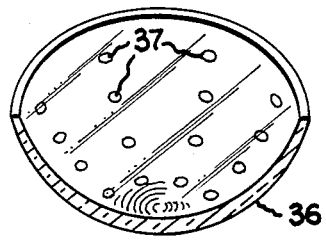
Figure 6:
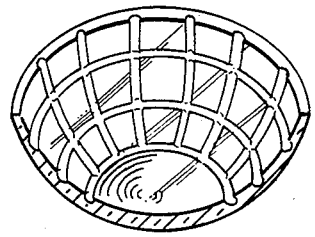

FIGS. 4, 5 and 6 illustrate other kinds of surface configurations which can be achieved by the method of the invention. FIG. 4 shows lens 36 having a multiplicity of bifocal corrections in the form of a series of pits, or dimples 37 on the posterior surface of the lens. A lens of this kind is made with a mask having opaque spots of any desired pattern.

FIG. 5 shows a lens 38 with a Fresnel pattern formed by a series of concentric circular grooves 39. These are formed by using a mask that has imprinted on it, by photographic or other means, a series of concentric circles.

FIG. 6 shows another kind of special purpose lens having bifocal capabilities. It is made by the use of a photographic transparency mask having an opaque screen or grid pattern.

Although it is usually preferable that the patterns on the mask be totally opaque to the actinic irradiation, this is not essential. It is also possible in the method of the invention to use transparent screens having patterns that are not totally opaque but that are of substantially greater optical density than the transparent areas of the mask. This can still provide a differential of irradiation and of polymerization rate that will produce the desired surface configurations.

Both hard and soft polymeric contact lenses can be made by the method of the invention using various vinyl monomers and free radical polymerization.

Furthermore, the novel method can also be applied to hybrid lenses which contain both hard and soft segments. For hard lenses or hard segments of a hybrid lens acrylic polymers are especially useful. Examples include methyl methacrylate, ethyl methacrylate, isopropyl methacrylate, s-butyl methacrylate, t-butyl methacrylate, phenyl methacrylate, cyclohexyl methacrylate, 3,3,5-trimethylcyclohexyl methacrylate t-butyl acrylate, tetrahydrofurfuryl methacrylate, allyl methacrylate, cyclohexyl acrylate, tetrahydrofurfuryl acrylate and others. Other useful monomers include vinyl monomers which contain silyl groups, such as siloxanylalkyl vinyl acetate ester monomers such as disclosed in the patent to Ivani, U.S. Pat. No. 4,410,674, of which bis(-methacryloxybutyl) tetramethyl disiloxane is an example.

Also usable for hard lenses are copolymers formed by combining two or more vinyl monomers. If desired, crosslinking monomers may be added, such as ethylene glycol dimethacrylate, ethylene glycol diacrylate, pentaerythritol tetraacrylate and trimethylolpropane trimethacrylate. Preferably, from 70 to 100 percent by weight of the vinyl polymer in a hard lens is formed from one or more of methyl methacrylate, tetrahydrofurfuryl methacrylate and cyclohexyl methacrylate and from 0 to 30 percent by weight of one or more of ethylene glycol dimethacrylate, diethylene glycol dimethacrylate, triethylene glycol dimethacrylate or tetraethylene glycol dimethacrylate.

The polymers used in soft contact lenses of soft segments of hybrid lenses are wettable, hydrophilic vinyl polymers which are sparingly crosslinked. When hydrated they swell and become soft hydrogels, e.g., having Shore hardness of 40 or less on the A scale.

The hydrogel polymers can be made by the free-radical polymerization and crosslinking of a monomer composition containing one or more vinyl monomers. Preferred monomers include esters and amides of acrylic and methacrylic acid which have at least one hydrophilic functional group and also vinyl caprolactams.

Examples include the hydrogels obtained by hydrating the polymers of monomers of hydroxyalkyl methacrylates, the alkyl group having 2 or 3 carbon atoms, which are crosslinked with about 0.1 to 2 percent by weight of an acrylic or dimethacrylic ester of an alkylene glycol having 2 to 3 carbon atoms or with divinylaromatics, polyether methacrylates, or other multifunctional addition monomers.

Especially useful hydrogel polymers are crosslinked polymers made from the following monomers and mixtures of monomers:

2-hydroxyethyl methacrylate (also known as HEMA)
2-hydroxypropyl methacrylate (also known as HyPMA)
HyPMA or HEMA with methacrylic acid
HyPMA or HEMA with 1-vinyl-2-pyrrolidinone
HyPMA or HEMA with 1-vinyl-2-pyrrolidinone and methacrylic acid
HyPMA or HEMA with 1-vinyl-2-pyrrolidinone and methyl methacrylate
HyPMA or HEMA with N-(1.1-dimethyl-3-oxobutyl) acrylamide 1-vinyl-2-pyrrolidinone with methyl methacrylate and allyl methacrylate
HEMA with HyPMA Preferred crosslinking agents for these monomers include divinylbenzene, 1,3-propandiol dimethacrylate and ethylene glycol, poly(ethylene glycol) dimethacrylates and trimethylolpropane trimethacrylate.

In both types of monomer compositions a free radical polymerization catalyst preferably is included. Examples include benzoin methyl ether, azobisisobutyronitrile along with isopropylperoxydicarbonate or dibenzoyl peroxide. The vinyl polymerization is normally exothermic and little if any heat need be supplied to promote polymerization. In fact it is preferred initially to maintain the reactants at room temperature in order that polymerization will not occur too rapidly in the masked shadow areas.

In manufacturing hydrogel soft contact lenses, it is desirable to prevent swelling and deformation of the lens during hydration. This can be done by including an inert diluent substance in the hydrogel monomer composition. The diluent occupies space in the three dimensional crosslinked polymer that subsequently is occupied by water. When the lens is hydrated, water or saline solution replaces the diluent in a volume exchange. The lens, therefore, does not adversely change its dimensions when hydrated, in contrast to the situation in which a soft hydrogel lens is made without a diluent and is then hydrated.

Preferred diluents in the method of the invention are non-volatile, inert liquids such as diethylene glycol monobutyl ether and glycerine. Other possible diluents include the solid diluents disclosed in the patent to Erikson, U.S. Pat. No. 4,121,885.

The following example illustrates the method of the invention in the casting of plastic contact lenses having grooves on their posterior surface.

EXAMPLE

In a series of runs under different conditions lenses were made by spincasting an acrylic monomer using a rotatable concave plastic mold of the kind shown in FIGS. 1 and 2. The monomer composition was as follows:

| Component | Function | Wt. % |
| --- | --- | --- |
| Hydroxyethylmethacrylate | Principal monomer | 83.5 |
| Ethyleneglycol dimethacrylate | Crosslinking agent | 0.5 |
| Benzoin methyl ether | Catalyst | 0.5 |
| Isobornyl Methacrylate | Provide structural rigidity | 10.0 |

-continued

| Component | Function | Wt. % |
|---|---|---|
| Methacroyl glycine | Raise water content | 6.0 |

Four short lengths of copper wire were taped to the upper rim of the mold, each extending radially from the edge toward, but not to, the center of the mold, so as to cast a shadow with respect to radiation from above the mold in the form of four radial lines on the surface of the liquid in the mold. In each run a quantity of the monomer composition was placed in the mold, the mold was blanketed with nitrogen and rotated at a selected velocity while exposed from above by ultraviolet radiation. Table I lists the quantities of monomer composition (fill volume), the rotational velocity (RPM), the post optical radius (P.A.R.) and the cylinder dimension of the lens. The polymerized lenses were removed from the mold and hydrated in a conventional manner. Radial grooves suitable as tear ducts were observed in the lenses of runs 1-6.

TABLE I

| Run No. | Fill Volume (1) | RPM | P.A.R. (mm) | Cylinder (mm) | Grooves | Image |
|---|---|---|---|---|---|---|
| (1) | 15.95 | 300 | 6.3 | 0.032 | Yes | Good |
| (2) | 15.95 | 300 | 7.902 | 0.020 | Yes | Good |
| (3) | 12.5 | 300 | 7.764 | 0.044 | Yes | Good |
| (4) | 12.5 | 300 | 7.774 | 0.070 | Yes | Good |
| (5) | 12.5 | 300 | 7.804 | 0.014 | Yes | Good |
| (6) | 12.5 | 30 | 7.746 | 0.046 | Yes | Good |
| (7) | 12.5 | 250 | 8.854 | 0.028 | No | Good |
| (8) | 12.5 | 350 | 8.392 | 0.06 | No | Good |

The results recorded in Table I above show that by the method of the invention it is possible to form grooves in the posterior surface of a contact lens without lathing and without sacrificing the image quality in the optic zone. The fact that grooves were not formed in runs 7 and 8 shows that the RPM's, the fill volume and the radiation intensity must be coordinated. However, by routine tests the suitable combinations of these variables can readily be determined.

The method of the invention can also produce polymeric contact lenses having grooves or other surface deformations in their anterior surfaces, i.e., the convex surfaces which contact the mold. To accomplish this a transparent plastic mold is used and the mold is exposed to U.V. radiation from the underside instead of from above as in the Example above. When irradiating from below the mark is affixed to the underside of the rotating mold.

Although the invention has been described in detail with reference to preferred embodiments, variations and modifications can be made within the spirit and scope of the invention as described above and as claimed.

We claim the following:

1. A method of making a contact lens of a desired surface configuration which comprises:
    placing a quantity of polymerizable monomer on the mold surface of a one piece mold,
    irradiating monomer on the mold surface with actinic radiation of wavelength and intensity effective to cause said monomer to polymerize,
    the irradiation of said monomer being through a mask pattern having shadow areas and clear areas, said pattern controlling the configuration of the lens by forming relatively thick lens portions corresponding to the clear areas of said mask and relatively thin lens portions corresponding to the shadow areas of said mask,
    the conditions of irradiation being such that in the regions of the monomer which correspond to the shadow areas of the mask the monomer is polymerized at a rate slower than in the regions corresponding to the clear areas of the mask.

2. A method according to claim 1 wherein narrow grooves for the flow of tears are formed on the posterior surface of the contact lens by irradiating that surface through a mask having opaque lines corresponding to the desired grooves.

3. A method according to claim 2 wherein the opaque lines are formed by metallic wires.

4. A method according to claim 2 wherein the opaque lines are printed on a transparent photographic support.

5. A method according to claim 4 wherein a Fresnel lens is formed by irradiating the monomer through a pattern of concentric circles printed on a photographic support.

6. A method according to claim 1 wherein the lens has a multitude of bifocal corrections and is formed by irradiating the monomer through a screen pattern printed on a photographic transparency.

7. A method of spin casting a contact lens of a desired surface configuration which comprises:
    placing a quantity of polymerizable monomer on a mold surface,
    irradiating said monomer on said mold surface with actinic radiation of wavelength and intensity effective to polymerize said monomer,
    the irradiation of said monomer being through a mask pattern having shadow areas and clear areas where said mask is fixed relative to said mold surface and where said mask pattern controls the configuration of the lens said clear areas of said mask corresponding to relatively thick lens portions and said shadow areas corresponding to relatively thin lens portions,
    the conditions of irradiating being such that in the regions of the monomer which correspond to the shadow areas of the mask the monomer is polymerized at a rate slower than in the regions corresponding to the clear areas of the mask.

* * * * *